UNITED STATES PATENT OFFICE.

OSCAR DOEBNER, OF HALLE-ON-THE-SAALE, GERMANY, ASSIGNOR TO THE FARBENFABRIKEN OF ELBERFELD COMPANY, OF NEW YORK, N. Y.

CONDENSATION PRODUCT FROM SALICYLIC AND GALLIC ACIDS.

SPECIFICATION forming part of Letters Patent No. 602,834, dated April 26, 1898.

Application filed November 4, 1897. Serial No. 657,363. (Specimens.) Patented in Germany March 3, 1896, No. 94,281.

*To all whom it may concern:*

Be it known that I, OSCAR DOEBNER, professor at the university at Halle-on-the-Saale, Prussia, Germany, residing at the same place, (assignor to the FARBENFABRIKEN OF ELBERFELD COMPANY, of New York,) have invented a new and useful Improvement in Pharmaceutical Compounds, (for which I have already obtained Letters Patent in Germany, No. 94,281, dated March 3, 1896;) and I do hereby declare the following to be a clear and exact description of my invention.

My invention relates to the production of a new condensation product from salicylic acid and gallic acid.

It is known that by acting with phosphorous oxychlorid on salicylic acid salicylid is formed and that on treating gallic acid with phosphorous oxychlorid tannin is produced. I have now found that this process proceeds in a totally different manner if phosphorous oxychlorid is allowed to act on a mixture of equimolecular proportions of salicylic acid and gallic acid. According to my researches a new condensation product is thus obtained, one molecule of water being separated from one molecule of salicylic acid and one molecule of gallic acid, which process may be illustrated by the following equation:

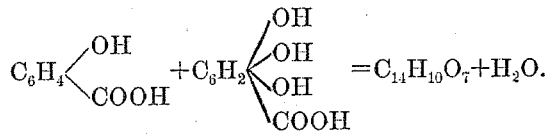

Obviously this new compound ($C_{14}H_{10}O_7$) is an anhydrid formed from salicylic and gallic acids, having probably the structural formula:

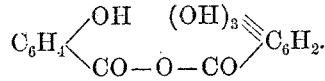

In carrying out my process practically I can proceed as follows (without limiting myself to the particulars given in the following example:) Forty kilos, by weight, of salicylic acid are mixed very intimately with fifty kilos, by weight, of gallic acid, $C_6H_2(OH)_3 \cdot CO_2H$. Forty kilos, by weight, of phosphorous oxychlorid (and, if desired, any indifferent solvent or diluent, such as toluene or the like) are added to the above mixture. The mass is then gradually heated—say by means of an oil-bath—to about 130° centigrade. Hydrochloric-acid gas soon begins to be set free, and the mixture at first assumes a slightly-reddish tinge and subsequently a light-yellow coloration. After some hours the reaction is complete, the mixture forming a solid mass. Ice-water is then added in order to remove the meta-phosphoric acid formed during the reaction and the phosphorous oxychlorid used in excess. After this treatment the solid mass is minced, repeatedly washed with hot water, and finally dried. The new product thus obtained distinctly differs from salicylid and tannin, forming a white amorphous powder, insoluble in water, ether, chloroform, scarcely soluble in cold alcohol and in cold alkaline carbonates, soluble with readiness in caustic alkalies. From its solution in caustic alkalies it is precipitated by the addition of acids. If heated in a capillary tube, it begins to liquefy at about 190° centigrade, not having a precise melting-point. By caustic alkalies and alkaline carbonates at elevated temperatures it is gradually split into its components—viz., salicylic acid and gallic acid.

My new compound unites in itself the therapeutical properties of salicylic acid and those of tannin or gallic acid, and it may therefore be used with advantage for medicinal purposes. The average dose is one to three grams daily.

Having now described my invention and in what manner the same is to be performed, what I claim as new, and desire to secure by Letters Patent, is—

1. The process for producing a new condensation product from salicylic acid and gallic acid consisting in allowing phosphorous oxychlorid to react on a mixture of equimolecular proportions of salicylic and gallic acids which reaction may be carried out in the presence of a solvent and diluent, such as toluene, subsequently removing the formed meta-phosphoric acid by pouring the mixture on ice-water, washing the thus-obtained solid mass, and drying the final product substantially as described.

2. As a new article of manufacture the new condensation product from salicylic and gallic acids having probably the formula:

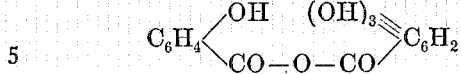

being a white amorphous powder insoluble in water, ether, chloroform, soluble with readiness in caustic alkalies, being precipitated from its solution in cold caustic alkalies by the addition of acids, substantially as described.

In testimony whereof I have signed my name in the presence of two subscribing witnesses.

OSCAR DOEBNER.

Witnesses:
 RUDOLPH FRICKE,
 BERNHARDT PETZOHY.